US009665312B2

(12) United States Patent
Osadchyy et al.

(10) Patent No.: US 9,665,312 B2
(45) Date of Patent: May 30, 2017

(54) MANAGING PRINTING DEVICES BY DISPLAYING MODEL GROUPS BASED ON MODEL TYPES (71) Applicant: KYOCERA Document Solutions Inc., Osaka (JP)

(72) Inventors: Oleksandr Osadchyy, Concord, CA (US); Ankur Chhabra, Pleasanton, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/872,007

(22) Filed: Sep. 30, 2015

(65) Prior Publication Data
US 2017/0090826 A1 Mar. 30, 2017

(51) Int. Cl.
*G06F 3/12* (2006.01)
*H04L 12/24* (2006.01)

(52) U.S. Cl.
CPC .......... *G06F 3/1203* (2013.01); *G06F 3/1231* (2013.01); *G06F 3/1287* (2013.01); *H04L 41/12* (2013.01)

(58) Field of Classification Search
CPC .... G06F 3/1231; G06F 3/1226; G06F 3/1229; G06F 3/1232
See application file for complete search history.

(56) References Cited

U.S. PATENT DOCUMENTS

| 7,016,740 | B2 | 3/2006 | Nakamura et al. | |
| 2004/0039811 | A1* | 2/2004 | Nakamura | G06F 3/1204 709/223 |
| 2013/0301069 | A1* | 11/2013 | Yanagi | G06F 3/1204 358/1.13 |
| 2014/0240739 | A1* | 8/2014 | Hattori | G06F 3/1219 358/1.13 |
| 2015/0138579 | A1* | 5/2015 | Miyazaki | H04N 1/00007 358/1.13 |
| 2015/0278669 | A1* | 10/2015 | Akiyama | G06K 15/4095 358/1.14 |

* cited by examiner

*Primary Examiner* — Benny Q Tieu
*Assistant Examiner* — Haris Sabah
(74) *Attorney, Agent, or Firm* — McDonnell Boehnen Hulbert & Berghoff LLP (57) ABSTRACT

Example systems and methods are disclosed for organizing and displaying printing devices based on model types. An example method may include determining, from a data source, accessible printing devices and their corresponding identifiers, model types, and display names. The method may also include determining, from a different data source, model group identifiers for the model types of the accessible printing devices. The method may further include grouping the accessible printing devices based on their model types into model groups having unique model group identifiers. The method may even further include generating, for display, the display names of the accessible printing devices organized by the model groups. The method may also include generating configuration parameters for one or more of the accessible printing devices based on a selected model group.

17 Claims, 6 Drawing Sheets

| ROW | MODEL GROUP | MODEL GROUP ID | DISPLAY NAME |
|---|---|---|---|
| 1 | 1 | MG1 | 10_NORTH |
| 2 | 1 | MG1 | 20_NORTH |
| 3 | 2 | MG2 | 10_EAST |
| 4 | 2 | MG2 | 20_EAST |
| 5 | 2 | MG2 | 20_SOUTH |
| 6 | 3 | MG3 | 10_SOUTH |
| 7 | 4 | MG4 | 10_WEST |
| 8 | 4 | MG4 | 20_WEST |

| MODEL GROUP | MODEL GROUP ID | MODEL | COMPANY A | | COMPANY B | |
|---|---|---|---|---|---|---|
| | | | MODEL | DEVICE ID | DISPLAY NAME | MODEL | DEVICE ID | DISPLAY NAME |

| MODEL GROUP | MODEL GROUP ID | MODEL | COMPANY A MODEL | COMPANY A DEVICE ID | COMPANY A DISPLAY NAME | COMPANY B MODEL | COMPANY B DEVICE ID | COMPANY B DISPLAY NAME |
|---|---|---|---|---|---|---|---|---|
| 1 | MG1 | 1.0 | 1.0 | 1.0_A | 10_NORTH | 1.0 | 1.0_B | 20_NORTH |
| 2 | MG2 | 2.0 | 2.0 | 2.0_A | 10_EAST | 2.0 | 2.0_B | 20_EAST |
| 2 | MG2 | 2.1 | | | | 2.1 | 2.1_B | 20_SOUTH |
| 3 | MG3 | 3.0 | 3.0 | 3.0_A | 10_SOUTH | | | |
| 4 | MG4 | 4.0 | 4.0 | 4.0_A | 10_WEST | | | |
| 4 | MG4 | 4.1 | | | | 4.1 | 4.1_B | 20_WEST |

Fig. 6

MANAGING PRINTING DEVICES BY DISPLAYING MODEL GROUPS BASED ON MODEL TYPES

BACKGROUND

Printing devices have increased in number and geographic footprint throughout the world and have become increasingly connected to networks. As a result, management and maintenance of printing devices has become more complex. Improving and/or simplifying management and maintenance of printing devices can enhance customer satisfaction and generate positive business results. Improving the organization and/or user interface displays of the organization of networked printing devices can improve management and maintenance of printing devices, thereby increasing customer satisfaction.

SUMMARY

In a first aspect, a method including determining, from a first data source, a plurality of accessible printing devices and corresponding printing device identifiers, corresponding model types, and corresponding display names for the plurality of accessible printing devices; determining, from a second data source, one or more model group identifiers for the corresponding model types of the plurality of accessible printing devices, wherein the second data source comprises model group identifiers, wherein one or more of the corresponding model types are assigned to each of the one or more model group identifiers; grouping the plurality of accessible printing devices based on their corresponding model types into one or more model groups, wherein each of the one or more model groups corresponds to a unique model group identifier; and generating, for display, the corresponding printing device display names of the plurality of accessible printing devices, wherein the printing device display names are displayed in the one or more model groups.

In a second aspect, a non-transitory computer readable medium storing instructions that are executable by one or more computing devices, wherein executing the instructions causes the one or more computing devices to perform functions including determining, from a first data source, a plurality of accessible printing devices and corresponding printing device identifiers, corresponding model types, and corresponding display names for the plurality of accessible printing devices; determining, from a second data source, one or more model group identifiers for the corresponding model types of the plurality of accessible printing devices, wherein the second data source comprises model group identifiers, wherein one or more of the corresponding model types are assigned to each of the one or more model group identifiers; grouping the plurality of accessible printing devices based on their corresponding model types into one or more model groups, wherein each of the one or more model groups corresponds to a unique model group identifier; and generating, for display, the corresponding printing device display names of the plurality of accessible printing devices, wherein the printing device display names are displayed in the one or more model groups.

In a third aspect, a system including one or more processors; and a memory storing instructions that when executed by the one or more processors causes the system to perform functions including determining, from a first data source, a plurality of accessible printing devices and corresponding printing device identifiers, corresponding model types, and corresponding display names for the plurality of accessible printing devices; determining, from a second data source, one or more model group identifiers for the corresponding model types of the plurality of accessible printing devices, wherein the second data source comprises model group identifiers, wherein one or more of the corresponding model types are assigned to each of the one or more model group identifiers; grouping the plurality of accessible printing devices based on their corresponding model types into one or more model groups, wherein each of the one or more model groups corresponds to a unique model group identifier; and generating, for display, the corresponding printing device display names of the plurality of accessible printing devices, wherein the printing device display names are displayed in the one or more model groups.

These, as well as other aspects, alternatives, and advantages, will become apparent to those of ordinary skill in the art by reading the following detailed description, with reference where appropriate to the accompanying drawings.

DETAILED DESCRIPTION

In the following detailed description, reference is made to the accompanying figures, which form a part hereof. It should be understood, however, that the arrangements described herein are set forth as examples only. As such, those skilled in the art will appreciate that other arrangements and elements (e.g., machines, interfaces, functions, orders of functions, etc.) can be used instead or in addition. Further, many of the elements described herein are functional entities that may be implemented as discrete or distributed components or in conjunction with other components, and in any suitable combination and location. Various functions described herein as being performed by one or more entities may be carried out by hardware, firmware or software logic. For instance, various functions described herein may be carried out by a processor executing instructions written in any suitable programming language and stored in memory.

In this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

I. Overview

The organization and display of managed printing devices may influence how effectively a user can manage and maintain printing devices. A user may rely on a software product to help with organizing and generating a user interface for the managed printing devices. Often times, the user may want to view and/or sort printing devices based on their model type.

For a software product that is installed locally on a user's computing device, the software product may be configured during installation to a specific set of printing devices, which may then determine the model types of the printing devices to display and sort for the user. However, for a software product run from a cloud server via a network (such as the Internet) connected to the user's computing device, this type of configuration during installation of the software product may not be possible. As a result, organization and display of printing devices by model type on a cloud server software application may be challenging for at least a few reasons.

First, a software product run on a cloud server may have access to hundreds of models for a single manufacturer, and tens of thousands of models from multiple manufacturers. Thus, displaying all of these models, most of which are not relevant to the user, may be computationally inefficient for the system, and overwhelming to the user. Furthermore, because most models are not relevant to the user, browsing through the large list of models may be a waste of the user's time. Additionally, browsing groups of models may be difficult for the user because many of the model types within a group of models may not be relevant to the user.

To overcome these challenges, a system may execute a method relying on a cloud server and one or more data sources containing information about the managed printing devices. First, the system may determine which printing devices are accessible for the user from a first data source. The system may also determine the printing device identifiers, model types, and display names for the accessible printing devices from the first data source. Next, the cloud server may determine model group identifiers for the model types of the accessible printing devices, based on a second data source. The second data source may contain information including a list of model group identifiers for one or more model groups, and the model types that correspond to each model group identifier.

The system may then group the accessible printing devices based on their corresponding model types into one or more model groups. In particular, each accessible printing device may be grouped to a corresponding model group identifier based on the model type of the accessible printing device. After grouping the devices, the system may generate, for display the display names corresponding to the accessible printing devices. The display names may be organized based on their corresponding model group.

The system may allow the user to select one or more of the model groups. Upon selection of a model group, the user may generate configuration parameters for printing devices corresponding to the selected model group. Additionally, the system may display, edit, and/or delete configuration parameters for printing devices accessible to the user based on the selected model group.

The system and method for organizing and displaying printing devices based on model type using the cloud server software has several benefits. First, the cloud server software can be used to organize and display printing devices for many different users and their corresponding printing devices. Further, the cloud server software may ensure that each user only views the devices accessible to the user. Thus, the cloud server software prevents the user from viewing and/or filtering numerous models of printing devices that are not relevant to the user (that is, models of printing devices maintained and/or managed by other users). As a result, the user has a cloud-based system that can organize and display his accessible printing devices based on model type. Furthermore, by using a cloud-based system, as opposed to custom software for each user, the cloud-based system mitigates integration issues that may exist with integrating many versions of custom software for various users.

II. Printing Device Examples

Figure 1:
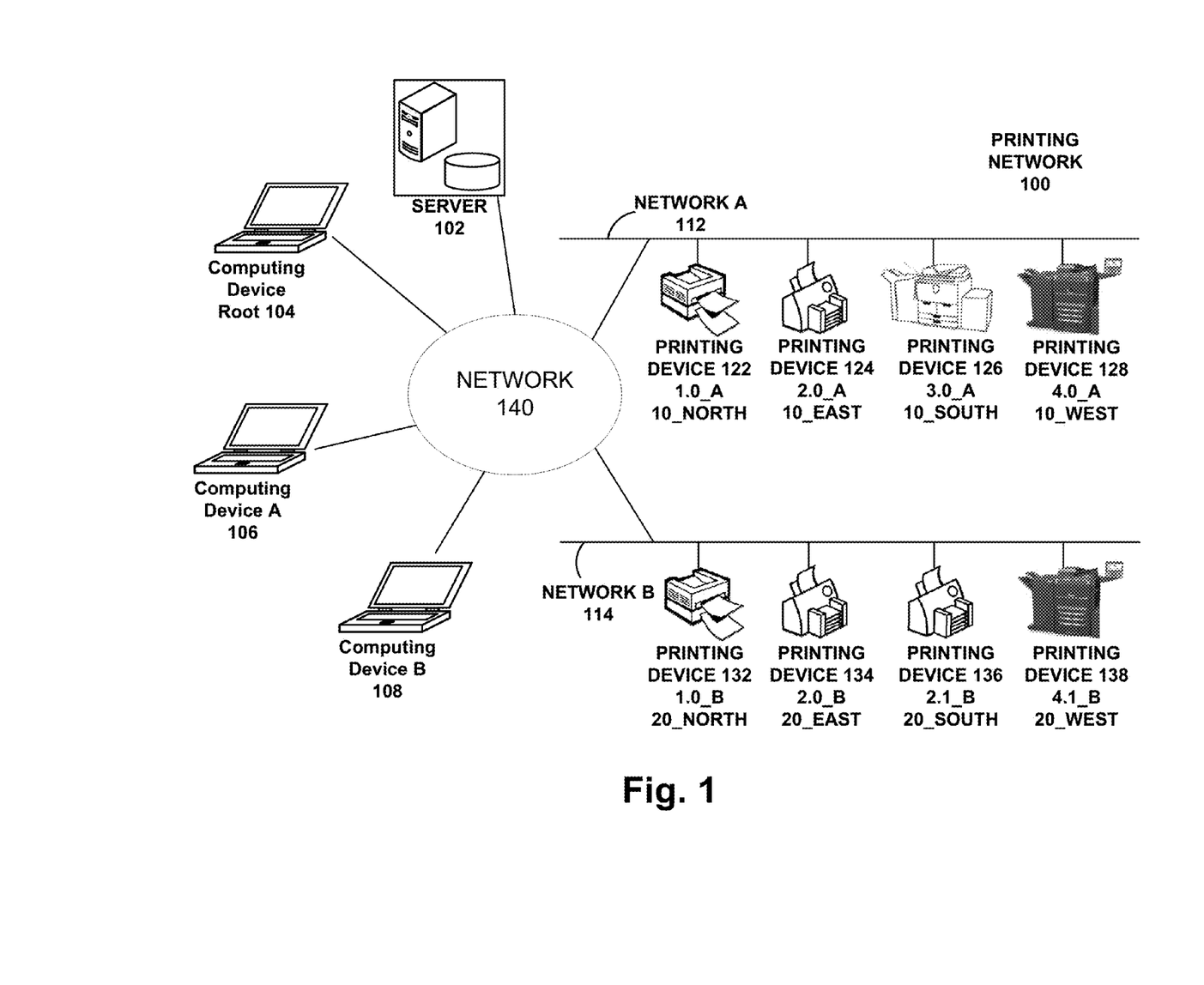
FIG. 1 illustrates an example printing network, according to an example embodiment.

FIG. 1 is a diagram illustrating printing network 100, according to an example embodiment. Printing network 100 includes server 102, computing device root 104, computing device A 106, and computing device B 108 interconnected using network 140. Printing network 100 also includes printing device 122, printing device 124, printing device 126, and printing device 128 interconnected using local network A 112. Printing network 100 also includes printing device 132, printing device 134, printing device 136, and printing device 138 interconnected using local network B 114. In some examples, printing network 100 can have more, fewer, and/or different types of servers, computing devices, networks, and/or printing devices than indicated in FIG. 1.

Server 102 may be a cloud server that can perform various tasks to manage and/or maintain printing devices. Server 102 may provide cloud software that is accessible by computing devices 104, 106, and 108 to manage printing devices displayed in network 100. The server 102 may gather information from the printing devices and computing devices of printing network 100 to enhance the provided software application. For example, the server 102 may receive information including registration information, display names, network locations, and/or other information that can enhance the delivery of the cloud software application from server 102. Server 102 may execute other tasks to further improve maintenance and/or management of the printing devices.

Although FIG. 1 displays server 102 as one computing device, the server 102 may include one or more computing devices that are at the same location, or at various locations. Server 102 may represent, or correspond to, an entity that is the manufacturer of some or all of the printing devices displayed in network 100. Alternatively, the printing devices displayed in network 100 may be manufactured by an entity different than the printing device manufacturer entity corresponding to server 102. Other embodiments are also possible.

Printing devices 122, 124, 126, 128 132, 134, 136 and 138 can include devices configured to scan, print, copy, e-mail, account for, communicate and/or otherwise process documents and/or files that are originally available either on paper or electronically. In some embodiments, printing devices 122, 124, 126, 128 132, 134, 136 and 138 can perform other tasks and/or other processing as well. Printing devices 122, 124, 126, 128 132, 134, 136 and 138 can include products from various manufacturers with variations in color, speed, computing power, functionality, network connectivity, and/or other features.

Printing devices 122, 124, 126, and 128 may be interconnected by local network A 112, while printing devices 132, 134, 136, and 138 may be interconnected by local network B 114. The printing devices on network A 112 may correspond to a first entity (such as Company A) while the printing devices on network B 114 may correspond to a second entity (such as company B, which may compete against company A). As a result, the printing devices on local network A 112 (for example, Company A's intranet) may not be able to communicate with the printing devices on local network B 114 (for example, Company B's intranet) via network 140.

However, printing devices 122, 124, 126, and 128 may be able to communicate with the server 102, computing device root 104, and computing device A 106 via network 140 (for example, the Internet) to execute various tasks and provide data. Furthermore, printing devices 132, 134, 136, and 138 may be able to communicate with the server 102, computing device root 104, and computing device B 108 via network 140 (for example, the Internet) to also execute various tasks and provide data. Other embodiments may also be possible.

Computing devices 104, 106, and 108 may each include one or more computing devices. Each computing device may represent a user that manages and/or maintains one or more of the printing devices on printing network 100. In the displayed embodiment, computing device root 104 has access to all of the printing devices displayed in network 100, while computing device A 106 has access to printing devices on network A 112, and computing device B 108 has access to printing devices on network B 114. Each computing device 104, 106, and 108 may communicate with server 102 via network 140 to use a cloud server software application to manage their corresponding accessible printing devices. Thus, each computing device 104, 106, and 108 may configure parameters for the accessible printing devices using a software application provided by server 102.

In some embodiments, the computing devices 104, 106, and 108 may each represent, or correspond to, different entities that are different from the entity of server 102. For example, all three computing devices may correspond to an entity that purchases printing devices, re-brands the printing devices, and distributes the printing devices, herein referred to as a dealer. Computing device A 106 may represent a first dealer that services the printing devices on network A 112. Computing device B 108 may represent a second dealer that services the printing devices on network B 114. Computing device root 104 may represent a third dealer that services printing devices on both network A 112 and network B 114. As a result, computing device A 106 may be granted access to printing devices on network A 112, while computing device B 108 may be granted access to the printing devices on network B 114. Meanwhile, computing device root 104 may have access to printing devices on both networks 112 and 114. In other embodiments, some or all of the computing devices 104, 106, and 108 may be part of the same dealer, but still have access to different printing devices described above.

In other embodiments, one or more of the computing devices 104, 106, and 108 may correspond to the same entity as server 102. Alternatively, computing device 106 may be a computing device of company A while computing device 108 is a computing device of company B. Other embodiments may also be possible.

Figure 2:
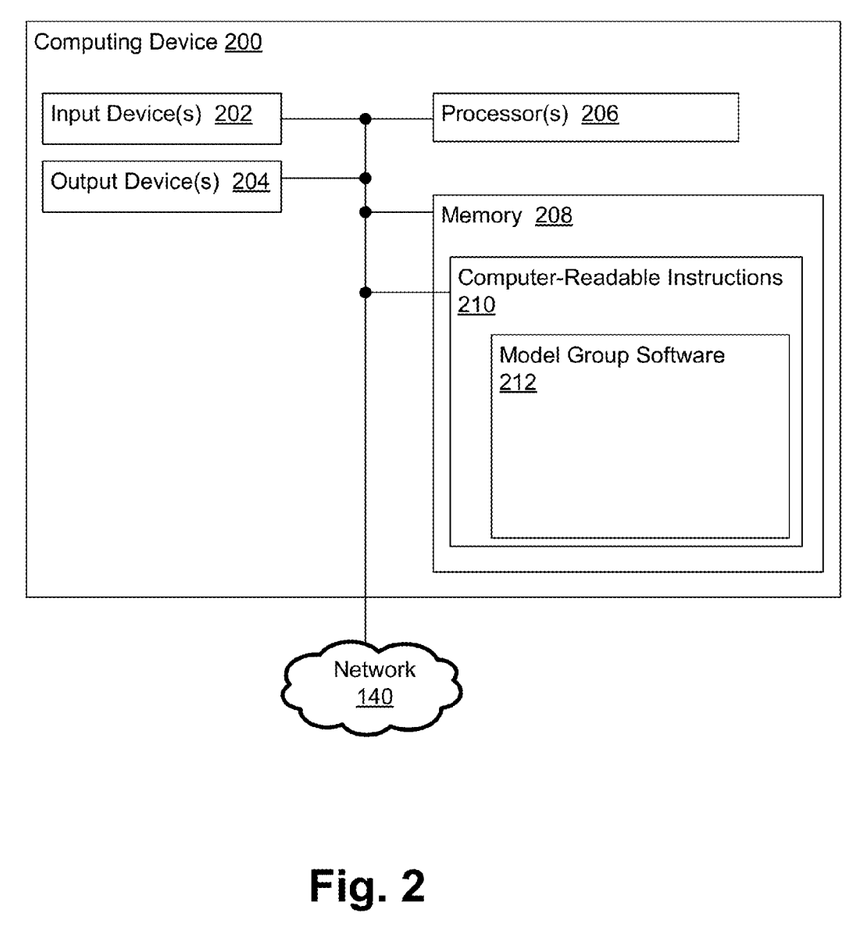
FIG. 2 is a schematic block diagram illustrating an example computing device, according to an example embodiment.

FIG. 2 is a schematic block diagram illustrating computing device 200, according to an example embodiment. In some embodiments, computing device 200 can be configured to perform one or more herein-described functions of printing network 100, server 102, computing devices 104, 106, and 108, printing devices 122, 124, 126, 128, 132, 134, 136, and 138, networks 112, 114, and 140, method 600, and/or part or the entire herein-described functionality related to communication flow 400.

Computing device 200 can include one or more input devices 202, one or more output devices 204, one or more processors 206 and memory 208. Input devices 202 can include user input devices, network input devices, sensors, and/or other types of input devices. For example, input devices 202 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of networks 112, 114, and/or 140, and/or wireless network receivers and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of networks 112, 114, and/or 140 (not displayed). Sensors can include devices configured to measure conditions in an environment of computing device 200 and provide data about that environment (such as location data). Example sensors include, but are not limited to, GPS sensor(s), location sensors(s), camera(s), light sensor(s), infrared sensor(s), and microphone(s). Other input devices 202 are possible as well.

Output devices 204 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 140, and/or wireless network transmitters and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 140. Other types of output devices can include, but are not limited to, vibration devices, haptic feedback devices, and non-visible light emission devices; e.g., devices that emit infra-red or ultra-violet light. Other output devices 204 are possible as well.

Processors 206 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processors 206 can be configured to execute computer-readable program instructions 210 that are contained in memory 208 and/or other instructions as described herein.

Memory 208 can include non-transitory machine-readable storage configured to store data and/or instructions. In particular, memory 208 can store machine-readable instructions 210 that, when executed by processor(s) 206, can cause a computing device to perform functions, such as but not limited to, functions of herein-described devices, networks, methods, features, and scenarios. In particular, machine-readable instructions 210 can include instructions for herein-described model group software 212, which may be performed by server 102.

These examples of a computing device are provided for illustrative purposes. In addition to and/or alternatively to the examples above, other combinations and/or sub-combinations of printer and computer technologies may also exist, amongst other possibilities, without departing from the scope of the embodiments herein.

III. Data Sources

Figure 3A:
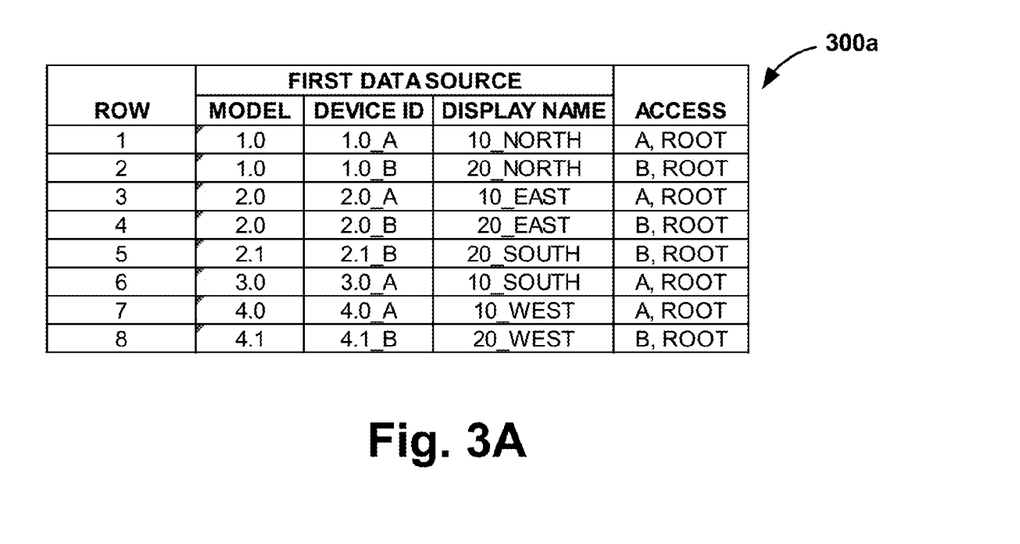
FIG. 3A illustrates an example of data at a data source, according to an example embodiment.

FIG. 3A displays a table 300a that contains information that may be stored in a first data source. The first data source may be a database with the device identifier as the primary key to uniquely identify records in the database. In the displayed embodiment, the first data source may include a model, a device identifier (ID), and a display name for each printing device. In the displayed embodiments, rows one, three, six, and seven of table 300a may correspond to FIG. 1 printing devices 122, 124, 126, and 128, respectively. Also, rows two, four, five, and eight of table 300a may correspond to FIG. 1 printing devices 132, 134, 136, and 138, respectively. In some embodiments, the first data source may also indicate a group of printing devices that a selected printing device is assigned to. Based on the assigned group, the system can determine which users have access to the printing device. In some embodiments, the first data source may include more, less, and/or different information than the information displayed in and/or described for FIG. 3A.

Information about a printing device may initially be received by the cloud server (such as server 102 in FIG. 1) during registration. In particular, a printing device may be registered first to a group serviced by the cloud server. Each group may have a unique access code which may be used to register the printing device. The printing device, in some embodiments, may be assigned to only one group. Once the printing device is registered to a group, the cloud server may remember the registration details of the printing device. In particular, the registration details of the printing device may be stored in a data source, such as the first data source. Alternatively, some or all of the registration details of a printing device may be stored in a separate data source.

Each group may have one or more printing devices assigned to it. Groups may be organized in a hierarchical structure. Each group may have one or more child groups. Alternatively, a group may not have a child group. Additionally, each group may be a child group within a parent group. A child group may only be assigned to one parent group, in some embodiments. Thus, a child group may not be assigned to multiple parent groups.

A user (such as computing devices 104, 106, and/or 108) may be assigned to one or more groups to access and/or manage the printing devices registered to the assigned group, as well as the printing devices assigned to the child groups created within the assigned group. Further, a user can be assigned to multiple groups. Thus, the accessible devices for a user can be determined based on the devices corresponding to the group(s) the user has been assigned to. Additionally, the accessible devices for a user will include devices assigned to child groups of the user's assigned groups.

For example, referring to FIG. 1, printing devices on network A 112 may be assigned to a first group that represents printing devices on the tenth floor of a building. Also, printing devices on network B 114 may be assigned to a second group that represents printing devices on the twentieth floor of the same building. Further, the first and second groups may be child groups of a parent group that is the third group that represents printing devices within the building. In FIG. 1, computing device 106 may be assigned to the first group, computing device 108 may be assigned to the second group, and computing device 104 may be assigned to the third group.

As a result, computing device 106 may have access to printing devices 122, 124, 126, and 128, while computing device 108 may have access to printing devices 132, 134, 136, and 138. Further, computing device 104 may have access to printing devices 122, 124, 126, 128, 132, 134, 136, and 138. In table 300a, the column "access" displays the computing devices that have access to the printing devices. In particular, computing device 104 corresponds to the entry "ROOT," computing device 106 corresponds to the entry "A," and computing device 108 corresponds to the entry "B." In some embodiments, the first data source may include information about the group that the device is assigned to. Using this information, the cloud server can then determine the accessible devices for one or more users by determining which groups the user has been assigned to.

The first data source may store model information, device identifier information, and display name information about a printing device. Information may be stored at the time of registration, or after registration in some embodiments. The model type of printing devices may correspond to multiple printing devices. For example, in table 300a, rows one and two correspond to one model type (model 1.0), which corresponds to two different printing devices (printing devices 122 and 132).

The device identifier, on the other hand, is a unique identifier that corresponds to only one printing device. In some embodiments, the device identifier may be assigned by the cloud server during registration. In the displayed embodiment of FIG. 3A, the device IDs are based on the model type and the network that the printing device is located on. For example, in row one, which corresponds to printing device 122, the device ID is 1.0_A, which corresponds to the printing device model of 1.0 and the local network A 112 for printing device 122. In other embodiments, the device ID assigned by the cloud server may be different than what is shown in FIG. 3A.

The display names may be set by a user based on the needs and or requirements of the user. Thus, in some cases, the display names may be unique, while in other cases, the display names may not be unique. Thus, in table 300a, display names for a printing device 122 (such as display name 10 NORTH) may be assigned by the user that can access the device, such as computing devices 104 and/or 106.

In the displayed embodiment, the first data source may be located at the cloud server. Alternatively, the first data source may be located at one or more of the user computing devices (such as computing device 104), a remote storage location, or a combination of the aforementioned locations. The first data source may be stored within one file, multiple files, a database, and/or multiple databases. Other embodiments and/or locations of the first data source may also exist.

Figure 3B:
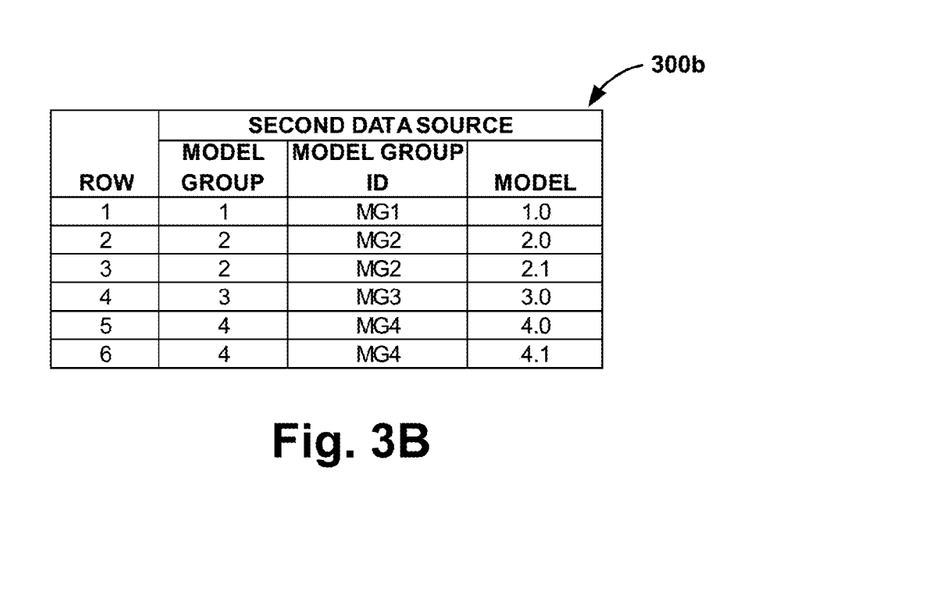
FIG. 3B illustrates another example of data at a data source, according to an example embodiment.

FIG. 3B displays a table 300b that contains information that may be stored in a second data source. In the displayed embodiment, the second data source may include a model group identifier (ID) and corresponding models. In some embodiments, the second data source may include more, less, and/or different information than the information displayed in and/or described for FIG. 3B.

The model group identifier indicates a particular model group corresponding to one or more models of printing devices. A model group may include multiple types of models. But while the models in a model group may be different, the different models may be grouped together because the models have many similar and/or common features. For example, in table 300b, rows two and three show two different models (2.0 and 2.1) assigned to the same model group identifier MG2. Although the two models are different, the two models may have many similar and/or common features, and thus are both assigned to model group identifier MG2. Model groups may allow many printing devices that have similar features to be selected, viewed, configured, managed, and/or maintained by a user at the same time.

Similar to the first data source, the second data source may be located at the cloud server, a remote storage location, some other location, or a combination of the aforementioned locations. The second data source may be stored within one file, multiple files, a database, multiple databases, and/or in some other manner. In one embodiment, an xml file may be maintained at the cloud server as the second data source. An example XML file corresponding to the data in FIG. 3B is presented below:

```
<?xml version="1.0" encoding="UTF-8"?>
<!DOCTYPE model-list SYSTEM "ModelGroup.dtd">
<model-list>
<model name="1.0" model_group_id="MG1">
</model>
<model name="2.0" model_group_id="MG2">
</model>
<model name="3.0" model_group_id="MG3">
</model>
<model name="4.0" model_group_id="MG4">
</model>
</model-list>
</xml>
```

Other embodiments and/or locations of the second data source may also exist.

Figure 4:
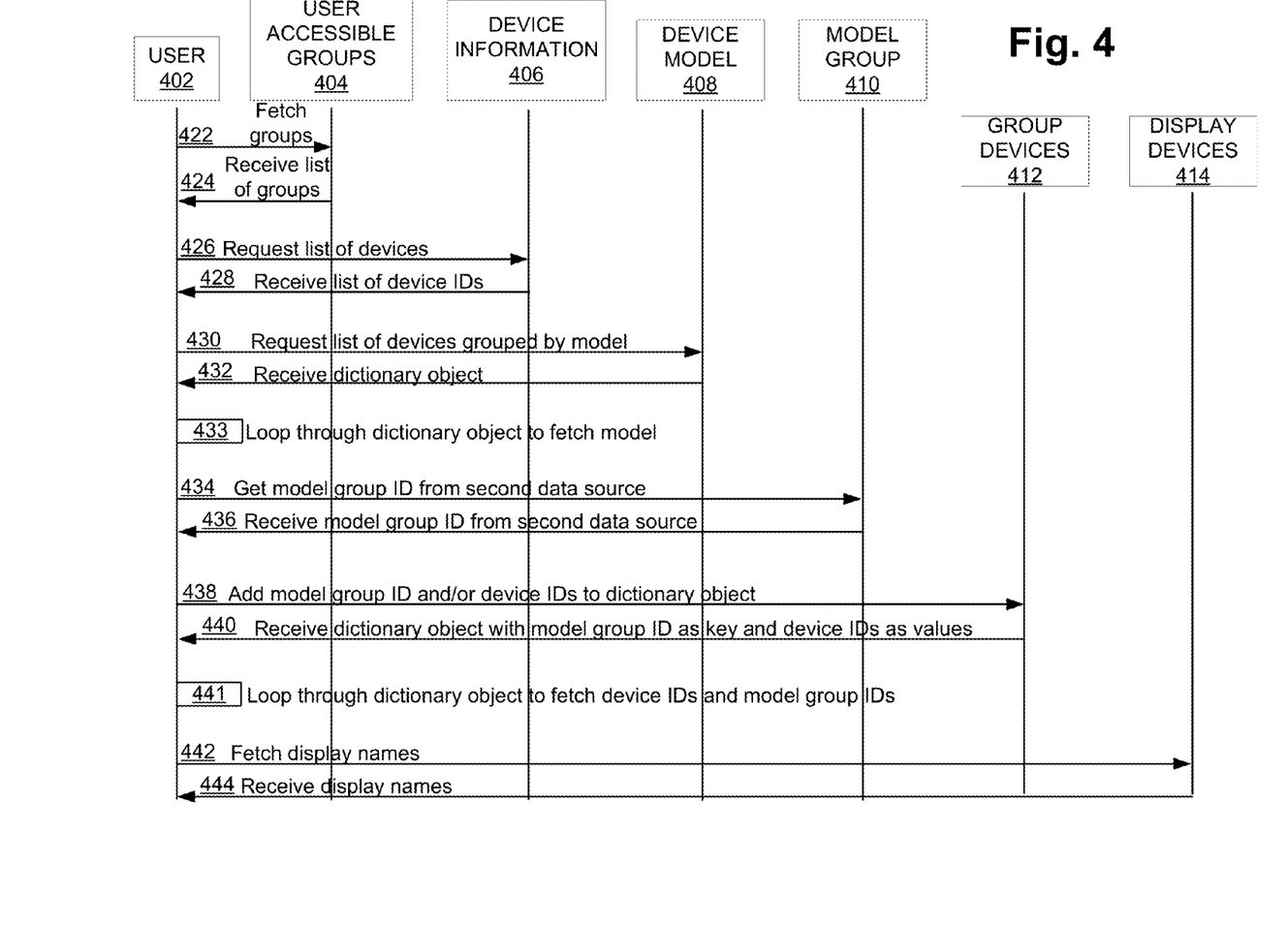
FIG. 4 illustrates a communication flow diagram, according to an example embodiment.

As can be seen in FIGS. 3A and 3B, the first and second data sources both include printing device models as part of their data. As a result, information from the second data source can be mapped to information from the first data source based on the printing device model. For example, model group identifiers can be determined for one or more device identifiers and/or display names based on the corresponding printing device models. FIG. 4 provides details on how to use printing device models to map printing device display names to model group identifiers.

IV. Communication Flow Diagram

FIG. 4 is a diagram of a communication flow sequence 400 for organizing and displaying accessible printing devices based on model groups. FIG. 4 includes stages user 402, user accessible groups 404, device information 406, device model 408, model group 410, group devices 412, and display devices 414. In some embodiments, the sequence 400 may use more, fewer, and/or different stages and/or steps than those displayed. Additionally, the sequence 400 may occur in a different order than the order displayed. The user 402 stage may correspond with the computing devices 104, 106, and/or 108 displayed in FIG. 1. Information for stages user 402, user accessible groups 404, device information 406, device model 408, and display devices 414 may be stored in a first data source, while information for model group 410 may be stored in a second data source. The steps and/or stages of sequence 400 may be executed by a cloud server, such as server 102 displayed in FIG. 1.

Sequence 400 may begin at stages 402 and 404 to determine user accessible groups for the user 402 by completing steps 422 and 424. The server may fetch accessible groups for user 402 by determining the list of groups the user is assigned to. In some cases, the server may access the first data source, which may indicate user accessible groups 404 for the user 402. The server may receive a list of accessible groups (step 424) indicating the accessible groups for user 402.

The sequence may continue to stage 406 to determine device information 406 for the devices that are part of the accessible groups for user 402. The server 102 may execute steps 426 and 428 to complete the stage. The server may request a list of devices (step 426) corresponding to the user accessible groups (from step 424) for user 402 from the first data source. The server may receive a list of device identifiers (step 428) corresponding to the devices that are part of the accessible groups.

Next, the sequence may continue to device model 408 to determine the models of the devices corresponding to the received device identifiers (from step 428). The server may execute steps 430 and 432 to determine the models that correspond to the received device identifiers. The server may request a list of the devices grouped by model from the first data source (see step 430). The server may receive a dictionary object that contains the list of the devices grouped by model (see step 432). The dictionary object may have model type as a key and the value be a list of device identifiers. An example of the dictionary object returned at step 432 is displayed below:

1.0, {1.0_A,1.0_B}
2.0,{2.0_A,2.0_B}
2.1,{2.1_B}
3.0,{3.0_A}
4.0,{4.0_A}
4.1,{4.1_B}

A dictionary is an object that represents a collection of pairs of data, with each pair including a key and a value. One can search and extract the value by passing the unique key into the dictionary. The dictionary object is a type safe data structure that provides faster lookups with keys to get values. A generic dictionary object may be built using a hash table. An example is provided below in the programming language C# for declaring a dictionary, and then adding items to the dictionary:

Dictionary<int,string> myDictionary=new Dictionary<int,string>( )
myDictionary.Add(1, "Item no'1");
myDictionary.Add(2, "Item no'2");
myDictionary.Add(3, "Item no'3");

Although the sequence 400 is described using dictionary objects, sequence 400 could be executed by using other data structures including lists, hash tables, sorted lists, sorted dictionaries, and/or other data structures.

The sequence may then execute the model group stage 410 and group devices stage 412 to determine the list of device identifiers that correspond with each model group. To complete these stages, the cloud server may execute steps

434, 436, 438, and 440. Additionally, the steps may be completed for each model type in the dictionary object returned from stage 408 (see step 432). Thus, as shown by step 433, the system may loop through the first dictionary object received in step 432 and complete steps 434, 436, 438, and 440 to generate a second dictionary object with a model group identifier as a key and a corresponding list of device identifiers as values.

The server may begin by generating a second dictionary object with the model group identifier as the key and the value being a list of device identifiers. Initially, the second dictionary object may not have any values in it. Other embodiments may also exist.

The server may then proceed to execute the stage model group 410 to determine the model group that corresponds with one or more device identifiers based on the model type. Specifically, the server may execute steps 434 and 436 by retrieving the model group identifier for the model group that corresponds to a selected model from the dictionary object of step 432. The model group identifiers may be retrieved from the second data source. After completing steps 434 and 436, the server may then proceed to stage group devices 412.

After stage 410, the server may proceed to stage group devices 412 by executing steps 438 and 440 for the retrieved model group identifier (see step 436) for the selected model. To execute step 438, the server may initially check the second dictionary object to determine if the model group identifier from step 436 is already part of the second dictionary object. If the server determines that the model group identifier is not within the second dictionary object, then the server may add the model group identifier (from step 436) to the second dictionary object, as well as the corresponding list of device identifiers. The list of device identifiers may be retrieved from the first dictionary object of step 432 using the selected model as a key.

However, if the model group identifier is already within the second dictionary object, then the server may merely append the list of device identifiers as the value for the existing model group identifier and the second dictionary object. Again, the list of device identifiers may be retrieved from the first dictionary object of step 432 using the selected model as a key. A scenario where the model group identifier may already be within the second dictionary object may occur when the model group identifier corresponds to multiple model types (such as a first model type in a second model type), and the device identifiers corresponding to one of the model types (such as the first model type) have already been added as the values for the model group identifier. In this case, when the second model type becomes the selected model, the corresponding device identifiers can merely be appended to the already existing model group identifier in the second dictionary object.

Once the server completes step 438, the server may then receive the updated second dictionary object (step 440), iterate the first dictionary object to the next selected model, and repeat steps 434, 436, 438, and 440 for the next selected model. The server may continue to iterate the selected model and execute steps 434, 436, 438, and 440 until the steps have been executed for all of the models of the first dictionary object. Once this is complete, step 440 may return a completed second dictionary object that contains the model group identifier as the key and a list of device identifiers as the value. An example of the dictionary object returned at step 440 is displayed below:

MG1,{1.0_A,1.0_B}
MG2, {2.0_A,2.0_B,2.1_B}
MG3, {3.0_A}
MG4, {4.0_A,4.1_B}

The second dictionary object may contain all device identifiers (see step 428) for printing devices that are part of the accessible groups (see step 424) for a user 402 and group the device identifiers into model groups.

The server may then proceed to execute stage display devices 414 by completing steps 442 and 444 for each model group identifier of the second dictionary object, as shown by step 441. First, the server may, for a selected model group identifier, retrieve display names (step 442) corresponding to the device identifiers. The device identifiers may be retrieved as a list of values from the second dictionary object by entering the model group identifier as a key. The display names may be fetched from the first data source. Once the display names are received (step 444), the server may add the received display names to a list of the display names grouped by model group. Additionally, the server may iterate the selected model group identifier to the next model group identifier, and repeat steps 442 and 444. The server may continue to iterate the selected model group identifier until the last model group identifier of the second dictionary object. Once complete, the server may return the list of the display names grouped by model group.

V. Model Group Examples

Figures 5A, 5B:
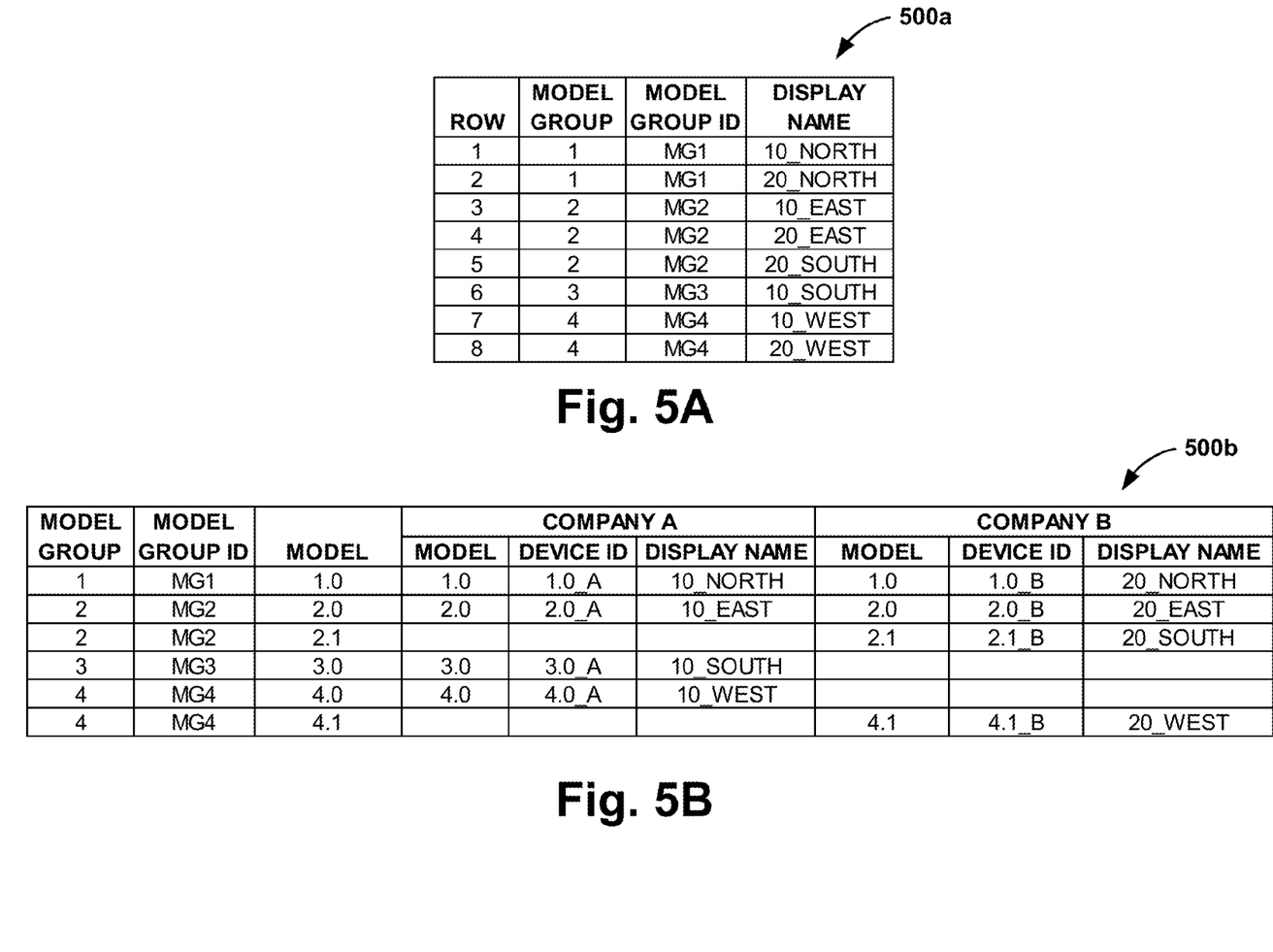
FIG. 5A illustrates an example grouping of devices, according to an example embodiment.
FIG. 5B illustrates another example grouping of devices, according to an example embodiment.

FIG. 5A displays a table 500*a* that shows an example of information in a list of display names grouped by model group. In particular, the information in table 500*a* may correspond to the list of display names grouped by model group produced by sequence diagram 400 of FIG. 4 for computing device 104. The table shows one or more printing device display names associated with each model group identifier. The table also includes a column for model group, which may not be part of the list of display names grouped by model group that is generated in sequence diagram 400 of FIG. 4. For computing device 106, the list of display names grouped by model group may only include the first, third, sixth, and seventh rows of table 500*a*, while the list of display names grouped by model group for computing device 108 may only include the second, fourth, fifth, and eighth rows of table 500*a*.

Although FIGS. 4 and 5A generate and/or display lists of display names grouped by model group, other device information could also be displayed and/or grouped by model group. FIG. 5B displays a table 500*b* that shows some of the printing device information that could be displayed and/or grouped by model group. The information includes a device identifier, device model, and model group identifier. Furthermore, the printing device information for particular groups (such as printing devices for company A, printing devices for company B) and/or users (such as computing device 104, 106, and/or 108) may also be selected for display by their corresponding model groups. Because the first and second data sources both include device models, printing device information that can be determined based on the corresponding model can potentially be displayed and grouped by model group. Other embodiments may also be possible.

One feature provided by model groups to users is that multiple printing devices can be selected, viewed, configured, managed, and/or maintained based on their model group. In particular, the cloud server may allow multiple devices within a model group to be selected. A user may be able to add and/or modify the configuration of the printing devices for the selected model group. A user may be able to add, edit, and/or delete configuration parameters for the printing devices of the selected model group. Similar functions may also be available to a user for a particular device, and/or for multiple devices corresponding to a particular model. Model groups may provide a user other functionalities for configuring one or more printing devices based on a selected model via software delivered by a cloud server (such as server 102 of FIG. 1).

VI. Example Methods

Figure 6:
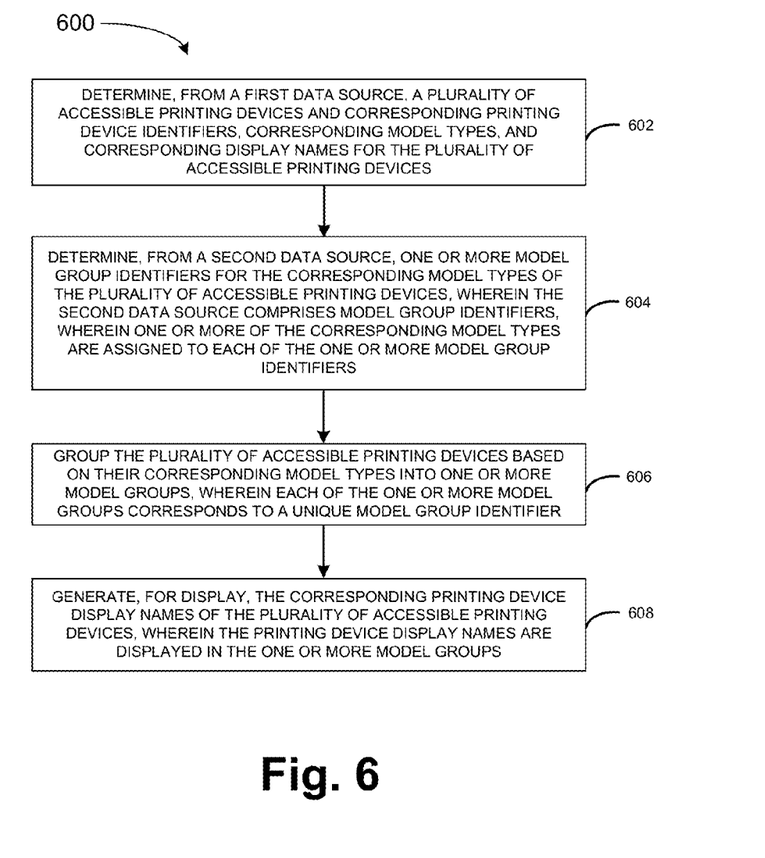
FIG. 6 shows a flowchart for a method, according to an example embodiment.

FIG. 6 illustrates a flow chart showing the method 600 that may allow for organizing and displaying printing devices based on printing device models, according to an example embodiment. The method 600 may be executed by a cloud server, such as the server 102 displayed in FIG. 1. Other devices or systems may execute method 600 in other embodiments.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 6. Where used, program code can be stored on any type of computer-readable medium, for example, such as a storage device including a disk or hard drive.

In addition, each block of the flowchart shown in FIG. 6 may represent circuitry that is wired to perform the specific logical functions in the process. Unless specifically indicated, functions in the flowchart shown in FIG. 6 may be executed out of order from that shown or discussed, including substantially concurrent execution of separately described functions, or even in reverse order in some examples, depending on the functionality involved, so long as the overall functionality of the described method is maintained.

As shown by block 602 of FIG. 6, method 600 may involve determining, from a first data source, a plurality of accessible printing devices and corresponding printing device identifiers, corresponding model types, and corresponding display names for the plurality of accessible printing devices. For example, in FIG. 1, server 102 may determine printing device identifiers, model types, and display names for accessible printing devices 122, 124, 126, 128, 132, 134, 136, and/or 138 for a user that has access to those printing devices, such as computing device 104.

Method 600 may further involve determining, from a second data source, one or more model group identifiers for the corresponding model types of the plurality of accessible printing devices, wherein the second data source comprises model group identifiers, wherein one or more of the corresponding model types are assigned to each of the one or more model group identifiers, as displayed by block 604 in FIG. 6. For example, in FIG. 1, server 102 may continue to determine the model group identifiers that correspond to the model types of accessible printing devices 122, 124, 126, 128, 132, 134, 136, and 138 for a user that has access to those printing devices, such as computing device 104. For another example, in FIG. 3B, an example of the information in the second data source (such as model group identifiers) may be displayed by table 300b.

Method 600 may also involve grouping the plurality of accessible printing devices based on their corresponding model types into one or more model groups, wherein each of the one or more model groups corresponds to a unique model group identifier, as shown by block 606 in FIG. 6. For example, in FIG. 1, the server 102 may group into model groups the accessible printing devices 122, 124, 126, 128, 132, 134, 136, and 138 for computing device 104. The server 102 may generate the model groups for the printing devices based on their corresponding model types.

Method 600 may additionally include generating, for display, the corresponding printing device display names of the plurality of accessible printing devices, wherein the printing device display names are displayed in the one or more model groups, as can be seen by block 608 in FIG. 6. For example, in FIG. 1, server 102 may generate for display the display names of accessible printing devices 122, 124, 126, 128, 132, 134, 136, and 138 grouped into model groups. The printing devices may be accessible to computing device 104. For another example, FIG. 5A displays a table 500a that shows information in a list of display names grouped by model group for computing device 104.

VII. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent from the foregoing descriptions. Such modifications and variations are intended to fall within the scope of the appended claims.

With respect to any or all of the ladder diagrams, scenarios, and flow charts in the figures and as discussed herein, each block and/or communication may represent a processing of information and/or a transmission of information in accordance with example embodiments. Alternative embodiments may be included within the scope of such example embodiments. Further, more or fewer blocks and/or functions may be used with any of the ladder diagrams, scenarios, and flow charts discussed herein, and these ladder diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, and/or a tangible storage device.

Additionally, any enumeration of elements, blocks, or steps in this specification, the drawings, or the claims is for purposes of clarity. Thus, such enumeration should not be interpreted to require or imply that these elements, blocks, or steps adhere to a particular arrangement or are carried out in a particular order.

It should be understood that arrangements described herein are for purposes of example only. As such, those skilled in the art will appreciate that other arrangements and other elements (e.g., machines, interfaces, functions, orders, groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting with the true scope and spirit being indicated by the following claims.

The invention claimed is:

1. A method to control a plurality of accessible printing devices, the method comprising:
  determining, from a first data source, the plurality of the accessible printing devices and corresponding printing device identifiers, corresponding model types, and corresponding display names for the plurality of the accessible printing devices;
  determining, from a second data source, one or more model group identifiers for the corresponding model types of the plurality of the accessible printing devices, wherein the second data source is different from the first data source and comprises model group identifiers, wherein one or more of the corresponding model types are assigned to each of the one or more model group identifiers;
  grouping the plurality of the accessible printing devices based on their the corresponding model types into the one or more model groups identifiers, wherein each of the one or more model groups identifiers corresponds to a unique model group identifier; and
  generating, for display, the corresponding printing device display names of the plurality of accessible printing devices, wherein the printing device display names are displayed in the one or more model groups identifiers,
  wherein, determining the plurality of accessible printing devices and the corresponding printing device identifiers comprises:
  fetching accessible groups for a user by determining a list of groups the user is assigned to;
  receiving a list of accessible groups indicating the accessible groups for the user;
  requesting a list of printing devices corresponding to the user accessible groups for the user;
  receiving a list of the printing device identifiers corresponding to the devices that are part of the accessible groups;
  requesting a the list of the printing devices grouped by model from the first data source;
  receiving a dictionary object containing the list of the devices grouped by the model, wherein the dictionary object has model type as a key and a value of the list of device identifiers;
  looping through the first dictionary object;
  generating a second dictionary object with a model group identifier as a key and a corresponding list of the device identifiers as values; and
  retrieving the model group identifier for the model group that corresponds to a selected model from the first dictionary object.

2. The method of claim 1, further comprising:
  generating configuration parameters for a portion of the accessible printing devices based on a selected model group.

3. The method of claim 1, further comprising:
  providing, for display, configuration parameters for a portion of the accessible printing devices based on a selected model group.

4. The method of claim 1, further comprising:
  editing configuration parameters for a portion of the accessible printing devices based on a selected model group.

5. The method of claim 1, further comprising:
  deleting configuration parameters for a portion of the accessible printing devices corresponding to one or more model types assigned to a selected model group identifier, wherein the configuration parameters are deleted based on one or more selected printing device display names.

6. The method of claim 1, wherein the plurality of accessible printing devices are part of a set of printing devices including restricted printing devices different from the accessible printing devices, wherein one or more restricted printing devices have the same model type as one or more accessible printing devices.

7. The method of claim 6, wherein the one or more restricted printing devices have different printing device display names from the one or more accessible printing devices.

8. The method of claim 1, further comprising: checking the second dictionary object to determine if the model group identifier is already part of the second dictionary object;
  adding, if the model group identifier is not within the second dictionary object, the model group identifier to the second dictionary object; and
  appending, if the model group identifier is within the second dictionary object, the list of the printing device identifiers as the value for an existing model group identifier and the second dictionary object.

9. The method of claim 8, wherein, generating the corresponding printing device display names of the plurality of the accessible printing devices comprises:
  retrieving, for a selected model group identifier, the device display names corresponding to the device identifiers as a list of values from the second dictionary object by entering the model group identifier as a key; and
  adding the received display names to a list of the display names grouped by the model group.

10. A non-transitory computer readable medium storing instructions that are executable by one or more computing devices, wherein executing the instructions causes the one or more computing devices to perform functions comprising:
  determining, from a first data source; a plurality of accessible printing devices and corresponding printing device identifiers; corresponding model types, and corresponding display names for the plurality of the accessible printing devices;
  determining, from a second data source, one or more model group identifiers for the corresponding model types of the plurality of the accessible printing devices, wherein the second data source is different from the first data source and comprises the model group identifiers; wherein one or more of the corresponding model types are assigned to each of the one or more the model group identifiers;

grouping the plurality of the accessible printing devices based on their the corresponding model types into one or more the model groups identifiers, wherein each of the one or more the model groups identifiers corresponds to a unique model group identifier; and generating, for display, the corresponding printing device display names of the plurality of accessible printing devices, wherein the printing device display names are displayed in the one or more model groups identifiers, wherein, determining the plurality of the accessible printing devices and corresponding printing device identifiers comprises:

fetching accessible groups for a user by determining a list of groups the user is assigned to;

receiving a list of accessible groups indicating the accessible groups for the user;

requesting a list of printing devices corresponding to the user accessible groups for the user;

receiving a list of the printing device identifiers corresponding to the devices that are part of the accessible groups;

requesting the list of the printing devices grouped by model from the first data source;

receiving a dictionary object containing the list of the devices grouped by model, wherein the dictionary object has model type as a key and a value of a list of device identifiers;

looping through the first dictionary object;

generating a second dictionary object with a model group identifier as a key and a corresponding list of the device identifiers as values; and retrieving the model group identifier for the model group that corresponds to a selected model from the first dictionary object.

11. The non-transitory computer readable medium of claim 10, wherein executing the instructions further causes the one or more computing devices to perform functions comprising:

generating configuration parameters for a portion of the accessible printing devices based on a selected model group;

providing, for display, configuration parameters for the portion of the accessible printing devices based on the selected model group; and editing configuration parameters for the portion of the accessible printing devices based on the selected model group.

12. The non-transitory computer readable medium of claim 10, wherein the plurality of the accessible printing devices are part of a set of printing devices including restricted printing devices different from the accessible printing devices, wherein one or more the restricted printing devices have the same model type as one or more the accessible printing devices, and the one or more the restricted printing devices have different printing device display names from the one or more the accessible printing devices.

13. A system comprising: one or more processors; and a memory storing instructions that when executed by the one or more processors causes the system to perform functions comprising:

determining, from a first data source, a plurality of accessible printing devices and corresponding printing device identifiers, corresponding model types, and corresponding display names for the plurality of the accessible printing devices;

determining, from a second data source, one or more model group identifiers for the corresponding model types of the plurality of the accessible printing devices, wherein the second data source is different from the first data source and comprises the model group identifiers, wherein one or more of the corresponding model types are assigned to each of the one or more the model group identifiers;

grouping the plurality of the accessible printing devices based on their the corresponding model types into one or more the model groups, wherein each of the one or more the model groups identifiers corresponds to a unique model group identifier; and generating; for display; the corresponding printing device display names of the plurality of the accessible printing devices, wherein the printing device display names are displayed in the one or more the model groups identifier, wherein, determining the plurality of the accessible printing devices and the corresponding printing device identifiers comprises:

fetching accessible groups for a user by determining a list of groups the user is assigned to;

receiving a list of accessible groups indicating the accessible groups for the user;

requesting a list of printing devices corresponding to the user accessible groups for the user;

receiving a list of printing device identifiers corresponding to the devices that are part of the accessible groups;

requesting the list of the printing devices grouped by model from the first data source;

receiving a dictionary object containing the list of the devices grouped by the model, wherein the dictionary object has model type as a key and a value of a list of device identifiers;

looping through the first dictionary object;

generating a second dictionary object with a model group identifier as a key and a corresponding list of the device identifiers as values; and retrieving the model group identifier for the model group that corresponds to a selected model from the first dictionary object.

14. The system of claim 13 wherein the instructions further cause the one or more processors to perform functions comprising:

generating configuration parameters for a portion of the accessible printing devices based on a selected model group; and providing, for display, configuration parameters for the portion of the accessible printing devices based on the selected model group.

15. The system of claim 13 wherein the instructions further cause the one or more processors to perform functions comprising:

editing configuration parameters for a portion of the accessible printing devices based on a selected model group.

16. The system of claim 13 wherein the instructions further cause the one or more processors to perform functions comprising:

deleting configuration parameters for a portion of the accessible printing devices corresponding to one or more model types assigned to a selected model group identifier, wherein the configuration parameters are deleted based on one or more selected printing device display names.

17. The system of claim 13, wherein the plurality of accessible the printing devices are part of a set of printing devices including restricted printing devices different from the accessible printing devices, wherein one or more the restricted printing devices have the same model type as one or more the accessible printing devices and the one or more the restricted printing devices have different printing device display names from the one or more the accessible printing devices.

* * * * *